(No Model.)
J. L. & J. SMITH.
HORSE HAY RAKE.
No. 430,151. Patented June 17, 1890.
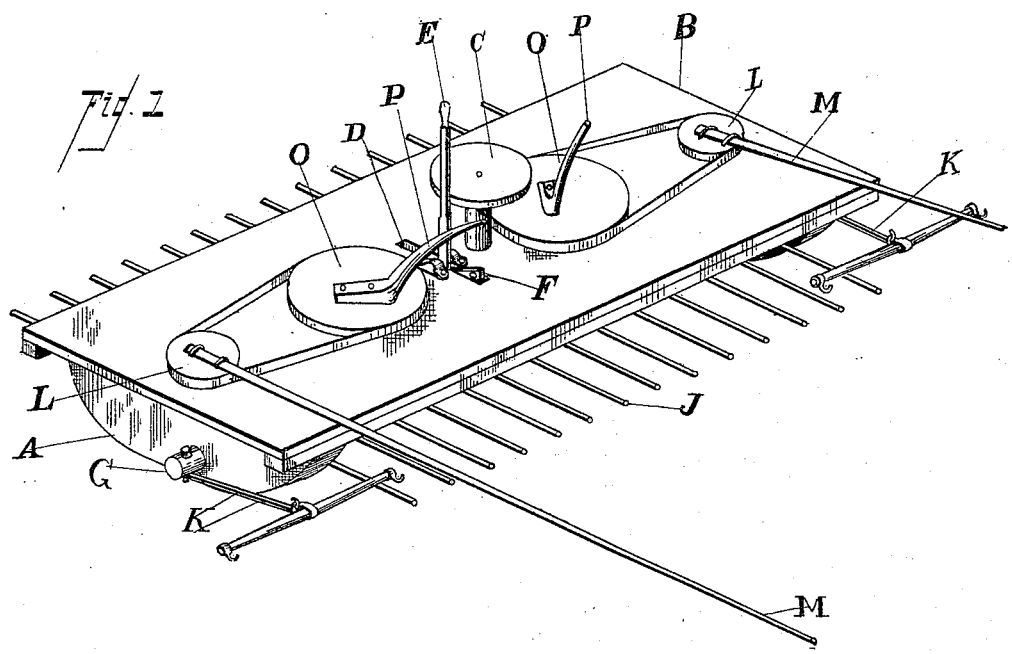
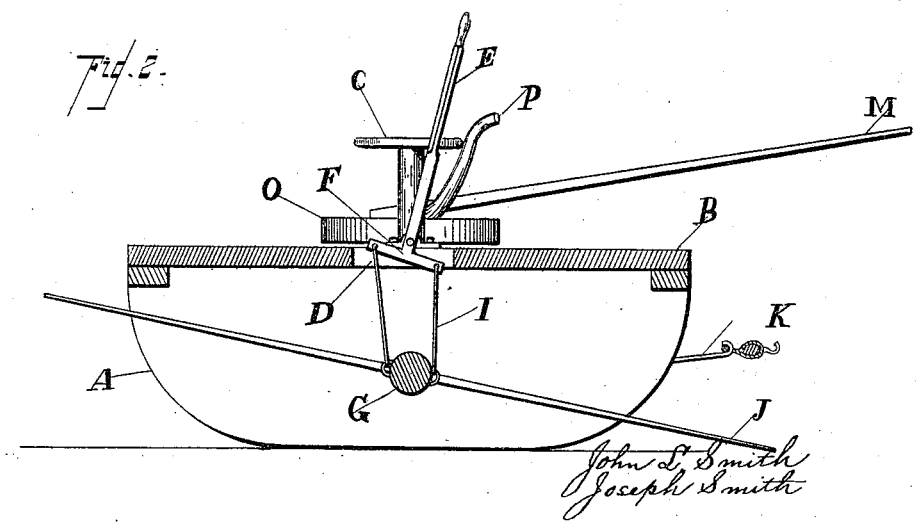
WITNESSES
T. Willoughby
R. H. Bishop
INVENTORS
John L. Smith
Joseph Smith
By W. T. FitzGerald
Attorney

UNITED STATES PATENT OFFICE.

JOHN L. SMITH AND JOSEPH SMITH, OF UNIONVILLE, MISSOURI.

HORSE HAY-RAKE.

SPECIFICATION forming part of Letters Patent No. 430,151, dated June 17, 1890.

Application filed March 12, 1890. Serial No. 343,601. (No model.)

*To all whom it may concern:*

Be it known that we, JOHN L. SMITH and JOSEPH SMITH, citizens of the United States, residing at Unionville, in the county of Putnam and State of Missouri, have invented certain new and useful Improvements in Horse Hay-Rakes; and we do hereby declare the following to be a full, clear, and exact description of the invention, such as will enable others skilled in the art to which it appertains to make and use the same.

Our invention relates to improvements in horse hay-rakes; and it consists in certain novel features hereinafter set forth.

In the accompanying drawings, Figure 1 is a perspective view of our improved horse hay-rake, and Fig. 2 is a vertical section of the same.

Referring to the drawings by letter, A A designate runners, which support the device and which are connected at their upper edges by the platform B, as shown. On the upper side of the platform, at about the center of the same, we arrange a seat C, upon which the driver sits while the rake is in use.

Adjacent to the driver's seat we form a transverse slot D in the platform, and a lever E is pivoted on the upper side of the platform and passes through said slot, the lower end of said lever being provided with a cross-head F, as clearly shown in Fig. 2.

The rake-head G is mounted at its ends in the runners, and is connected near its center with the ends of the cross-head F by means of the upwardly-diverging arms I. The rake-head can thus be rotated so as to bring either end of the rake-teeth into position to take up the hay. The rake-teeth J, it will be noticed, are secured to the rake-head so as to project therefrom both forward and backward, and the machine is thus adapted to positively and efficiently take up the hay when moving in either direction. The teeth may be constructed of wood, steel, or other material. The ends of the rake-head are extended beyond the runners, and draft-hooks K are secured to said extended ends.

At the ends of the platform, on the upper side of the same, we pivot or journal the pinions L, to the upper sides of which we secure the guide-arms M. These guide-arms M terminate in rear of the heads of the draft-animals, and have their free ends attached to the bits by short straps or other similar means, so that when the team is reversed the guide-arms may clear the heads of the animals.

O designates gear wheels or segments, which are mounted on the upper side of the platform and are connected to the pinions L by belts, chains, or intermeshing cog-teeth. These gear wheels or segments are provided with the lever-arms P on their upper sides, which project inward to a point near the driver's seat, so that they may be easily grasped and operated. In the ends of the rake-head we mount the horizontal swinging draft-hooks K, to which the whiffletrees are attached.

In practice the machine is arranged, as shown, with the rake-teeth pointing toward the ground, so as to take up the hay as the machine is drawn forward. The team is driven over the field in the usual manner, and the teeth will be thus caused to pass under and gather up the hay. When the end of the field has been reached, the team is turned and the reversing gear wheels or segments operated to throw the guide-arms backward, thus guiding the draft-animals around the ends of the machine, reversing the draft-hooks, and adjusting the machine so that it can be run to the opposite end of the field without necessitating the backing of the team or the turning of the machine. When the rake is started on its return-trip, the hay will be automatically freed from the rake-teeth, and the rake-head is then rotated so as to depress the opposite ends of the teeth and cause them to take up the hay as the machine is drawn forward. If, however, it be desired to carry the gathered hay to another point, the teeth are vibrated before the machine is started on its return-trip, thus raising the gathered load of hay from the ground, as will be readily understood.

From the foregoing description, taken in connection with the accompanying drawings, it will be seen that we have provided a very simple and efficient hay-rake by which the hay will be effectually gathered, and which obviates the necessity of turning the machine or backing the team, and the advantages of the device are thought to be obvious.

Having thus described our invention, what we claim, and desire to secure by Letters Patent, is—

1. The combination of the platform, the pinions thereon having guide-arms projecting from the upper sides, the operating-wheels mounted on the platform and connected with the pinions, and the reversible draft-hooks mounted in the rake-head below the platform, as set forth.

2. The combination of the runners, the platform secured thereon, the oscillating rake-head mounted in the runners and provided with teeth on opposite sides, the lever mounted on the platform and having a T-head at its lower end, and the links having their upper ends pivoted to the opposite ends of the said T-head and their lower ends pivoted to diametrically-opposite points of the rake-head, as set forth.

In testimony whereof we affix our signatures in presence of two witnesses.

JOHN L. SMITH.
JOSEPH SMITH.

Witnesses:
 H. B. MARSHALL,
 W. A. SHELTON, Jr.